United States Patent [19]

Ijichi et al.

[11] Patent Number: 4,706,607
[45] Date of Patent: Nov. 17, 1987

[54] STALL HOUSE FOR LIVESTOCK BREEDING

[75] Inventors: Masakatsu Ijichi, Kagoshima; Yutaka Uehara, Fukushima; Masahiro Sakaguchi; Shinichi Imamura, both of Kagoshima, all of Japan

[73] Assignee: Kabushiki Kaisha Ijichi Shukeijo, Japan

[21] Appl. No.: 713,708

[22] Filed: Mar. 19, 1985

[30] Foreign Application Priority Data

Mar. 19, 1984 [JP] Japan ................................. 59-53059
Jun. 18, 1984 [JP] Japan ................................ 59-123615

[51] Int. Cl.⁴ ............................................. A01K 31/00
[52] U.S. Cl. ......................................... 119/16; 119/22
[58] Field of Search ...................... 119/16, 21, 22, 28

[56] References Cited

U.S. PATENT DOCUMENTS 1,967,333  7/1934  Smith ...................................... 119/1
3,110,286 11/1963  Clute ..................................... 119/22
3,677,229  7/1972  Blough et al. ........................ 119/16
4,242,809  1/1981  Elder ................................. 119/22 X Primary Examiner—John J. Wilson
Attorney, Agent, or Firm—Wyatt, Gerber, Shoup, Scobey and Badie

[57] ABSTRACT

The invention provides an improved stall house for livestock or, in particular, pig breeding in which the excrements from the animals can be disposed under very sanitary conditions with great labor saving. The inventive stall house comprises an array of pens with the floor formed of slatted boards through which the excrements can freely fall down on to the sawdust bed below in an underfloor excrement-receiving vessel extending from one end to the other of the array of pens and a travelling shuffler capable of running in the excrement-receiving vessel back and forth from one end to the other over the sawdust bed with simultaneous shuffling of the sawdust bed to introduce fresh air thereinto in order to promote the aerobic fermentation of the excrements by the aerobic fermentation bacteria in the sawdust. Additionally, an air blowout pipeline may be provided at the bottom of the sawdust bed which serves to further promote the aerobic condition of the sawdust bed and also to control the evaporation of the water content in the excrements.

2 Claims, 4 Drawing Figures

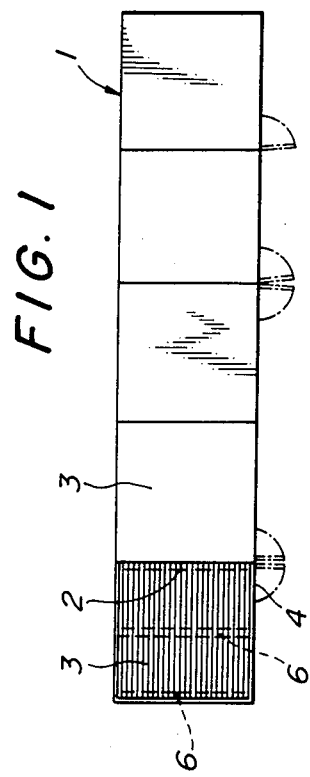
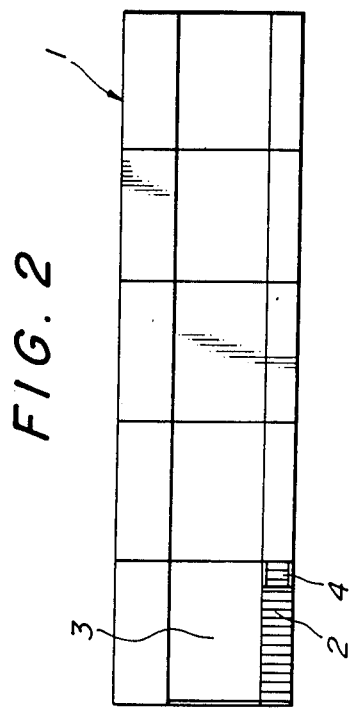
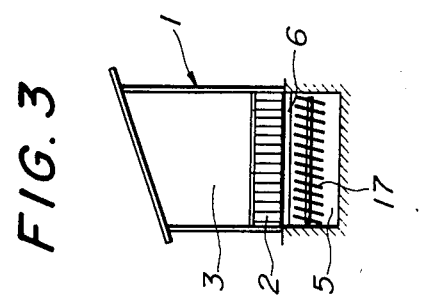

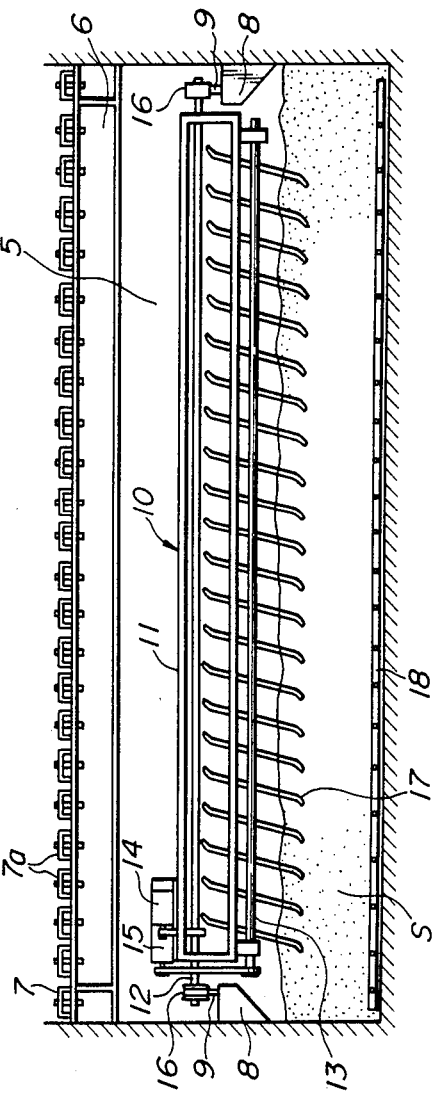

STALL HOUSE FOR LIVESTOCK BREEDING

BACKGROUND OF THE INVENTION

The present invention relates to a stall house for livestock breeding or, more particularly, to a stall house suitable for breeding pigs under sanitary conditions with great labor saving.

As is well known, the volume of the discharged excrementitious matter or, in particular, urine is especially large from pigs eating a large amount of the feed among the animals raised in husbandry. Therefore, economical disposal of the excrementitious matter is one of the largest problems in the pig breeding industry. A traditional method for the disposal of the excrements in a pig-breeding stall is to provide the stall house with an inclined concrete floor to facilitate collecting the excrements at and washing down the floor toward the lower end of the floor. Even by setting aside the very large investment for the construction of the facilities for the disposal of the collected excrements accompanying such a stall house, a very serious problem is unavoidable there in relation to the sewage disposal of the washings because discharge of such waste water is under strict regulations from the standpoint of preventing environmental pollution and such a traditional pig-breeding stall house is no longer usable unless a waterway free from the problem of pollution is available nearby.

In recent years, an improved pig-breeding stall house is under development in which a large volume of sawdust or the like material is spread in a thick layer all over the floor of the stall house with admixture of aerobic fermentative bacteria and the excrements from pigs are absorbed in the bed of sawdust in which the excrements are decomposed by the activity of the fermentative bacteria. The pig-breeding stall house of this type is advantageous, in particular, in the winter season because the fermentative decomposition of the excrements proceeds exothermically so that the energy cost for warming can be saved. A problem in such a stall house is the maintenance of the sawdust bed in an air-permeable condition in order to supply the aerobic bacteria with a sufficient volume of air indispensable for their activity and proliferation. Such an air-permeable condition of the sawdust bed can be obtained with frequent shuffling of the bed under fermentation taking a great deal of labor. When maintenance of the sawdust bed is insufficiently undertaken, the bed is trodden down by the animals so that the activity of the aerobic bacteria is lost to interrupt the aerobic fermentation and, instead, anaerobic fermentation possibly takes place to produce some noxious gases such as ammonia or the animals may eat the incompletely fermented sawdust to catch a disease thereby.

SUMMARY OF THE INVENTION

An object of the present invention is therefore to provide an improved stall house for livestock breeding or, in particular, for pig-breeding without the above mentioned problems and disadvantages in the conventional stall houses.

Thus, the stall house for livestock breeding of the invention comprises:

(a) a plural number of pens assembled in an array to form an elongated house and partitioned with fences each from the adjacent pens;

(b) slatted boards forming the floor of the pens installed in a demountable fashion;

(c) an excrement-receiving vessel under the floor of the pens extending from under the pen at one end of the array of pens to under the pen at the other end thereof and containing a bed of sawdust; and (d) a travelling shuffler for shuffling the sawdust bed in the excrement-receiving vessel and capable of running from one end to the other of the array of pens over the sawdust bed.

In the above described improved stall house, it is more advantageous to install an air blowout pipeline on the bottom of the excrement-receiving vessel as embedded in the sawdust bed so that fresh air can be blown into the sawdust bed according to need in order to promote the aerobic fermentation of the excrements absorbed in the sawdust bed by the aerobic fermentative bacteria.

BRIEF DESCRIPTION OF THE DRAWING

FIG. 1 is a plan view of the inventive stall house with five pens in an array showing the slatted floor.

FIG. 2 is a front view of the inventive stall house.

FIG. 3 is a cross sectional side view of the inventive stall house showing the underfloor travelling shuffler.

FIG. 4 is a cross sectional elevation of the excrement-receiving vessel under the slatted floor with the travelling shuffler and the air blowout pipeline.

DETAILED DESCRIPTION OF THE PREFERRED EMBODIMENTS

The inventive stall house for livestock breeding or, in particular, for fattening up of pigs is now described in detail with reference to the accompanying drawing.

As is illustrated in FIGS. 1 to 3 showing a plan view of the floor and a front and a side view of the stall house, respectively, the stall house 1 is generally in an elongated form and partitioned into several, five in the figure, pens 3, 3, . . . with the fences 2 and the pigs are enclosed in the individual pens 3 each provided with an enclosure fence 4 facing the front. The floor of each pen is formed by mounting at least one or a plural number of smaller steel-made slatted boards 7 on the beams 6 in a demountable fashion by means of, for example, screws. The slit width between the slats 7a of the slatted board 7 should be sufficiently large to ensure free falling of the excrements from the pigs therethrough but not too large to disturb the movement of the pigs in the pen 3.

Extending from one end to the other of the stall house 1, an underfloor excrement-receiving vessel 5 is formed by finishing with concrete. The vessel 5 may be installed either in the ground level or in the full or semi-underground level according to the site conditions. The depth of the excrement-receiving vessel 5 should be large enough to contain a sawdust bed S (see FIG. 4) and a travelling shuffler 10 described below.

Along and on the inner walls of the vessel 5 extending in the longitudinal direction of the stall house 1, as is illustrated in FIG. 4, are symmetrically provided a pair of bar brackets 8, 8 each of which supports a rail 9 extending from one end to the other of the stall house 1. A travelling shuffler 10 is mounted on these rails 9, 9 at the wheels 16, 16 and capable of travelling back and forth on and being guided by the rails 9, 9 when the driving shaft 12 supported by the framework 11 is driven. The framework 11 also supports the shaft 13 of the shuffler blades 17. The driving shaft 12 and the shuffler blade shaft 13 can be driven by means of the electric motors 14 and 15, respectively, mounted on the framework 11 and each connected to the respective shaft by use of pulleys and belt or gears. Each of the shuffler blades 17 should be so long as to ensure shuffling of at least the surface layer of the sawdust bed S spread all over the bottom floor of the vessel 5. The motors 14, 15 are energized with reversibility of the rotating directions by use of a control panel (not shown in the figures) installed somewhere outside the stall house 1.

Though not essential in the inventive stall house, an air blowout pipe line 18 is installed on the floor of the excrement-receiving vessel 5 as embedded in the sawdust bed S from which air is blown into the sawdust bed S as supplied by an air blower (not shown in the figures) so that the sawdust bed S can be kept in a fully aerobic condition to promote the fermentation of the pig excrements by the aerobic bacteria in the sawdust.

When pig-breeding is performed in the above described inventive stall house, the excrement-receiving vessel 5 is filled with sawdust to form a bed S of a suitable thickness and several pigs are enclosed in each of the pens 3 on the floor formed of the slatted boards 7. The sawdust is admixed in advance with fermentation bacteria for the fermentative decomposition of the excrementitious matter discharged from the pigs and falling on the sawdust bed S through the slatted boards 7 to be absorbed therein. Since the fermentation of the excrements in the sawdust bed proceeds exothermically, the water in the excrements is evaporated and discharged out of the house by a suitable ventilation means so that the pig-breeding environment can be moderately dry. It is of course advantageous to select a species or strain of the bacteria active at a relatively low temperature in the summer season and that of the bacteria active at a relatively high temperature in the winter season.

The aerobic fermentation of the excrements and evaporation of the water therein can be promoted by the air blowing from the air blowout pipeline into the sawdust bed and by the shuffling of at least the surface layer of the sawdust bed by the travelling shuffler. When the air blowout pipeline is spread all over the floor of the excrement-receiving vessel and shuffling of the sawdust bed is performed all over the sawdust bed timely from one end to the other, uniformity is obtained in the fermentation of the excrements and evaporation of the water. While it is desirable to keep the water content of the deposit in the excrement-receiving vessel in the range of 40–60%, the results of experiments teach that the disposal of the deposit by the aerobic fermentation can be performed satisfactorily without the drawbacks caused by the anaerobic fermentation even when the water content is as high as 80% provided that the sawdust bed is supplied with a sufficient volume of air by the combined use of the travelling shuffler and the air blowout pipeline.

It is of course that the water content of the deposit in the excrement-receiving vessel is largely dependent on the number of animals raised per unit floor area of the pens and the condition of the fermentation therein in addition to the ambient temperature and humidity. When the breeding density of pigs is about one per $m^2$ of the floor, for example, the water content of the deposit can readily be maintained at 50 to 60% and the volume of the deposit in the excrement-receiving vessel is gradually decreased along with the proceeding of the fermentative decomposition of the deposit and evaporation of water therefrom. In this case, disposal of the excrements from pigs can be performed even for 1 year or longer without the labor for the periodical discharge of the deposit out of the excrement-receiving vessel when the deposit is successively added with fresh portions of sawdust admixed with the aerobic fermentative bacteria. When the breeding density of pigs is increased to a level of one per about 0.7 $m^2$ or higher, on the other hand, the deposit may become too watery due to the disturbance of the water evaporation as a result of the loss in the permeability of the sawdust bed by the proceeding of the fermentation so that it is desirable to refresh the sawdust bed periodically when the sawdust in the deposit has been completely decomposed and aged taking, usually, about 3 months. The thus discharged deposit material is of very high value as a good manure useful in agriculture and horticulture. The works of the refreshment of the sawdust bed to collect and take out the old bed and to spread fresh sawdust admixed with the bacteria over the floor of the excrement-receiving vessel can be performed very efficiently by utilizing the travelling shuffler with replacement of the shuffler blades with suitable scraper blades.

As is understood from the above description, the present invention provides a possibility of great saving of the huge investment conventionally required for the outhouse facilities for the disposal of the excrements and sewage as well as of the labor required for daily management of the pigs under raising contributing to a great economization of the pig-breeding industry, if not to mention about the valuable byproduct manure having high quality for agriculture and horticulture. Moreover, the pigs can be bred under a very sanitary condition and the increasingly serious problem of the environmental pollution accompanying the livestock industry can be completely solved by this single invention.

Namely, the aerobic fermentation of the deposit proceeds always under optimum conditions so that the anaerobic fermentation can be suppressed to a negligible extent with production of almost no noxious or offensive gases such as ammonia. In addition, the sawdust in the deposit serves itself as an adsorbent or absorbent of the gases of offensive odor so that an almost odorless condition can readily be maintained inside the stall house. Further, the deposit in the excrement-receiving vessel is kept in an adequately moistened condition so that the offensive odor, if any, and dust are completely prevented from diffusing out of the stall house. In contrast with the excrementitious deposit in conventional pig pens containing numberless noxious microorganisms such as colon bacilli, staphylococci, salmonellae and the like, a microbiological examination indicated that the number of the colon bacilli constantly living in the deposit collected from the inventive stall house for pig breeding is 10 cells or less per g to be close to an aseptic condition. It is of course that no maggots are hatched in the deposit of the inventive stall house so that no flies are bred therefrom.

What is claimed is:

1. A stall house for livestock breeding which comprises:
    (a) a plural number of pens assembled in an array to form a house and partitioned with fences each from the adjacent pens;
    (b) slatted boards forming the floor of the pens installed in a demountable fashion;
    (c) an excrement-receiving vessel under the floor of the pens extending from under the pen at one end of the array of pens to under the pen at the other end thereof and containing a bed of sawdust; and (d) a travelling shuffler for shuffling the sawdust bed in the excrement-receiving vessel and capable of running from one end to the other of the array of pens over the sawdust bed contained in the excrement-receiving vessel.

2. The stall house for livestock breeding claimed in claim 1 which further comprises:

(e) an air blowout pipeline installed on the bottom floor of the excrement-receiving vessel.

* * * * *